United States Patent
Tamirisa (10) Patent No.: US 11,817,575 B2
(45) Date of Patent: Nov. 14, 2023

(54) GRADED COMPOSITION ELECTRODE WITH ACTIVE COMPONENT MIX AND SOLID-STATE ELECTROLYTE

(71) Applicant: Medtronic, Inc., Minneapolis, MN (US)

(72) Inventor: Prabhakar A. Tamirisa, Brooklyn Park, MN (US)

(73) Assignee: Medtronic, Inc., Minneapolis, MN (US)

( * ) Notice: Subject to any disclaimer, the term of this patent is extended or adjusted under 35 U.S.C. 154(b) by 140 days.

(21) Appl. No.: 17/133,502

(22) Filed: Dec. 23, 2020

(65) Prior Publication Data

US 2022/0199978 A1 Jun. 23, 2022

(51) Int. Cl.
  *H01M 4/36* (2006.01)
  *H01M 4/04* (2006.01)
  (Continued)

(52) U.S. Cl.
  CPC ......... *H01M 4/366* (2013.01); *H01M 4/0404* (2013.01); *H01M 4/48* (2013.01);
  (Continued)

(58) Field of Classification Search
  CPC ......... H01M 10/0525; H01M 10/0565; H01M 2004/027; H01M 2004/028; H01M 2300/0065; H01M 2300/0082; H01M 2300/0085; H01M 4/0404; H01M 4/06; H01M 4/08; H01M 4/139; H01M 4/364; H01M 4/366; H01M 4/48; H01M 4/485; H01M 4/58; H01M 4/587; H01M 4/62; H01M 4/621; H01M 4/64; H01M 6/181; Y02E 60/10
  See application file for complete search history.

(56) References Cited

U.S. PATENT DOCUMENTS 10,090,557 B2    10/2018   Trevey et al.
2007/0077488 A1*  4/2007   Chen ................. H01M 4/583
                                              429/219
(Continued)

FOREIGN PATENT DOCUMENTS

CN    110611119    12/2019
EP      0284104     9/1988
(Continued)

OTHER PUBLICATIONS

Machine Translation JPH07192763A (Year: 1995).*
Machine TranslationJP2020004686A (Year: 2020).*
Kwade et al., "Current Status and Challenges for Automotive Battery Production Technologies" Nature Energy, Apr. 12, 2018; 3(4):290-300.
International Search Report and Written Opinion for PCT/US2021/062187, dated Mar. 30, 2022. 11 pages.

*Primary Examiner* — Victoria H Lynch
(74) *Attorney, Agent, or Firm* — Mueting Raasch Group (57) ABSTRACT

A lithium-ion battery includes multiple electrodes. At least one of the electrodes is comprised of multiple sheets of electrode mixture, and each of the sheets includes a different percentage of a solid-state electrolyte within the electrode mixture. The sheets are laminated together and to a current collector such that a bottom sheet nearest the current collector comprises a lowest percentage of the solid-state electrolyte. A gradient of percentages of the solid-state electrolyte is formed from the bottom sheet to a topmost sheet comprised of a highest percentage of the solid-state electrolyte.

16 Claims, 5 Drawing Sheets

(51) Int. Cl.
  *H01M 4/48* (2010.01)
  *H01M 4/58* (2010.01)
  *H01M 4/62* (2006.01)
  *H01M 4/64* (2006.01)
  *H01M 6/18* (2006.01)
  *H01M 10/0525* (2010.01)
  *H01M 10/0565* (2010.01)
  *H01M 4/02* (2006.01)

(52) U.S. Cl.
  CPC ............ *H01M 4/58* (2013.01); *H01M 4/621* (2013.01); *H01M 4/64* (2013.01); *H01M 6/181* (2013.01); *H01M 10/0525* (2013.01); *H01M 10/0565* (2013.01); *H01M 2004/027* (2013.01); *H01M 2004/028* (2013.01); *H01M 2300/0082* (2013.01); *H01M 2300/0085* (2013.01)

(56) References Cited

U.S. PATENT DOCUMENTS

| | | | |
|---|---|---|---|
| 2015/0340741 A1* | 11/2015 | Kim | H01M 10/0585 29/623.1 |
| 2020/0212499 A1* | 7/2020 | Horikawa | H01M 10/0585 |
| 2022/0069279 A1* | 3/2022 | Nam | H01M 10/0525 |

FOREIGN PATENT DOCUMENTS

| | | |
|---|---|---|
| JP | 03179669 | 8/1991 |
| JP | 07192763 | 7/1995 |
| JP | 2020004686 | 1/2020 |
| WO | 2011/109815 | 9/2011 |

\* cited by examiner

GRADED COMPOSITION ELECTRODE WITH ACTIVE COMPONENT MIX AND SOLID-STATE ELECTROLYTE

FIELD

The present disclosure relates generally to the field of lithium-ion batteries or cells.

BACKGROUND

Lithium-ion batteries or cells include one or more positive electrodes, one or more negative electrodes, and, often, a liquid electrolyte provided within a case or housing. Separators made from a porous polymer or other suitable material may also be provided intermediate or between the positive and negative electrodes to prevent direct contact between adjacent electrodes, and liquid electrolytes infiltrate through pores in this porous polymer. Porosity is generally increased to increase the electrolyte volume fraction in the battery to improve rate capability of the battery. However, porosity can be difficult to control and accordingly electrolyte volume fraction can be difficult to control. Furthermore, there are safety and reliability concerns that arise with the usage of liquid electrolytes in batteries, and there is a general interest in replacing liquid electrolytes with solid-state electrolytes, particularly in certain applications.

SUMMARY

Embodiments described herein involve a lithium-ion battery comprising a negative electrode. A positive electrode comprises a plurality of sheets of electrode mixture. The plurality of sheets includes a first sheet comprised of a first electrode mixture including a first percentage of a solid-state electrolyte, and a second sheet comprised of a second electrode mixture including a second percentage of the solid-state electrolyte. The second percentage of solid-state electrolyte is lower than the first percentage of the solid-state electrolyte. The lithium-ion battery further comprises a current collector having the plurality of sheets laminated thereon. The plurality of sheets of the electrode are laminated together such that the second sheet is closer to the current collector than is the first sheet, and such that the first sheet is closer to a separator than is the second sheet.

Embodiments described herein involve an electrode comprising a plurality of sheets of electrode mixtures. The electrode mixtures are comprised of varying percentages of a solid-state electrolyte and an active material. The plurality of sheets are laminated together such that a top sheet comprises a highest percentage of the solid-state electrolyte, and such that a gradient of percentages of the solid-state electrolyte is formed from the top sheet to a bottommost sheet comprised of a lowest percentage of the solid-state electrolyte.

Embodiments described herein involve a method of fabricating an electrode. The method comprises providing a plurality of electrode mixtures comprised of varying percentages of a solid-state electrolyte, an active material, a conductive material, and a binder. The method further comprises sequentially applying a plurality of sheets to a current collector. A sheet of the plurality of sheets is comprised of an electrode mixture of the plurality of electrode mixtures, such that the plurality of sheets form a gradient from lowest percentage of solid-state electrolyte at a sheet closest to the current collector to highest percentage of solid-state electrolyte at a sheet furthest from the current collector. The method further includes calendering the applied sheets.

Advantages and additional features of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative and are not intended to limit the scope of the claims in any manner.

DETAILED DESCRIPTION

Reference will now be made in greater detail to various embodiments of the subject matter of the present disclosure, some embodiments of which are illustrated in the accompanying drawings. Like numbers used in the figures refer to like components and steps. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components.

Figure 1:
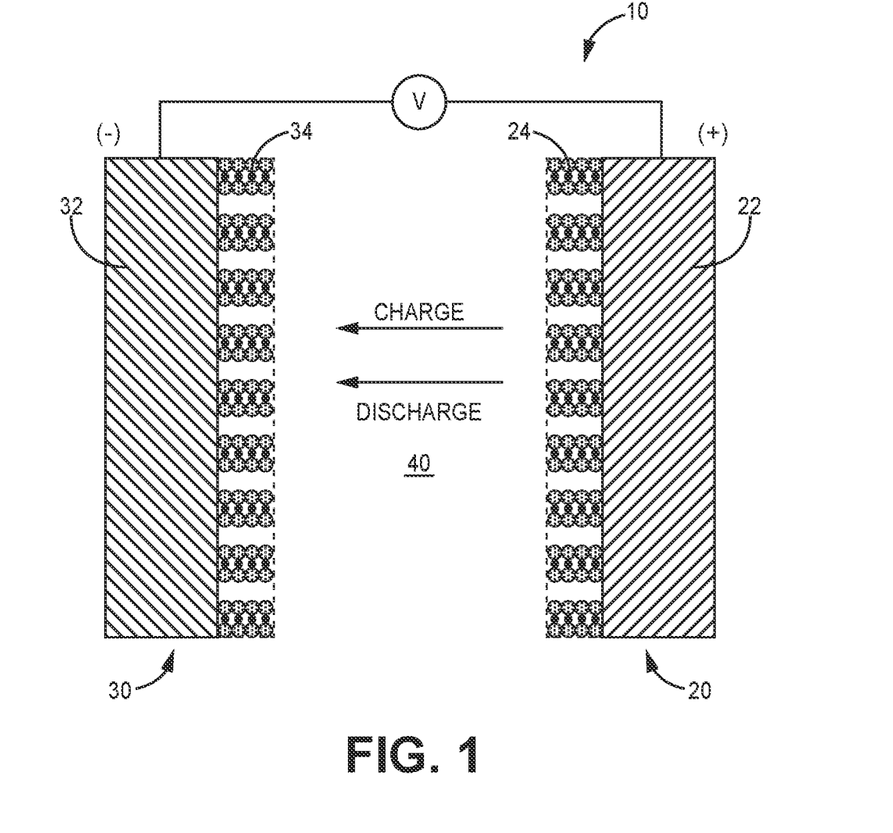
FIG. 1 shows a schematic representation of a portion of a lithium-ion battery in accordance with embodiments described herein.

FIG. 1 shows a schematic representation of a portion of a lithium-ion battery 10 such as that described herein. The battery 10 includes a positive electrode 20 that includes a positive current collector 22 and a positive active material 24, a negative electrode 30 that includes a negative current collector 32 and a negative active material 34, a separator 40 (e.g., a polymeric microporous separator) provided intermediate or between the positive electrode 20 and the negative electrode 30. The electrodes 20, 30 may be provided as relatively flat or planar plates or may be wrapped or wound in a spiral or other configuration (e.g., an oval configuration). The electrode may also be provided in a folded configuration. In any case, each of the electrodes may be comprised of a plurality of sheets, with each sheet being comprised of different proportions of solid-state electrolytes, active materials, conductors, and binders, as will be described in more detail later herein.

The separator 40 has generally allowed the flow of liquid electrolytes through the pores. However, recently there has been an increased interest in using solid-state electrolytes within the electrodes themselves to create electrodes, as will be described in more detail below. These solid-state electrolytes can replace or mostly replace liquid electrolytes.

Figure 2:
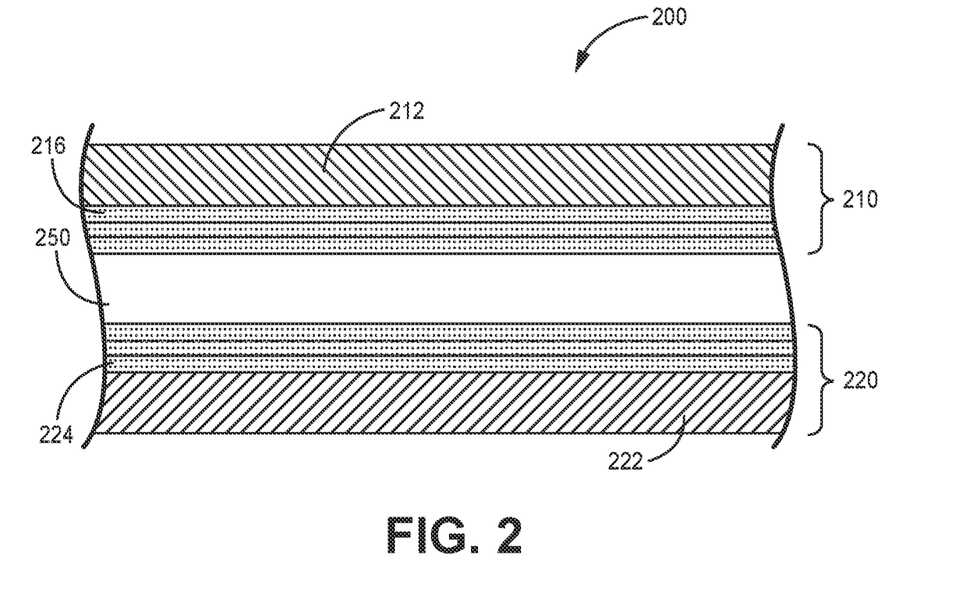
FIG. 2 is a schematic cross-sectional view of a portion of a battery or cell according to an exemplary embodiment that includes at least one positive electrode and at least one negative electrode in accordance with embodiments described herein.

FIG. 2 is a schematic cross-sectional view of a portion of a battery or cell 200 according to an exemplary embodiment that includes at least one positive electrode 210 and at least one negative electrode 220. The size, shape, and configuration of the battery may be selected based on the desired application or other considerations. For example, the electrodes may be flat plate electrodes, wound electrodes (e.g., in a jellyroll, folded, or other configuration), or folded electrodes (e.g., Z-fold electrodes). According to other exemplary embodiments, the battery may be a button cell battery, a thin film solid-state battery, or another type of lithium-ion battery.

The battery case or housing (not shown) is formed of a metal or metal alloy such as aluminum or alloys thereof, titanium or alloys thereof, stainless steel, or other suitable materials. According to another exemplary embodiment, the battery case may be made of a plastic material or a plastic-foil laminate material (e.g., an aluminum foil provided intermediate a polyolefin layer and a nylon or polyester layer).

A separator 250 is provided intermediate or between the positive electrode 210 and the negative electrode 220. According to an exemplary embodiment, the separator 250 is a polymeric material such as a polypropylene/polyethylene copolymer or another polyolefin multilayer laminate that includes micropores formed therein to allow electrolyte lithium ions to flow from one side of the separator to the other. In some embodiments, electrolytes are additionally provided in a solid-state within one or more of the electrodes 210, 220 themselves. In some embodiments, solid-state electrolytes can be provided in the separator as well as liquid-state electrolytes.

The positive electrode 210 includes a current collector 212 made of a conductive material such as a metal. According to an exemplary embodiment, the current collector 212 comprises aluminum or an aluminum alloy.

The current collector 212 has a layer of active material 216 provided thereon (e.g., coated on the current collector). While FIG. 2 shows that the active material 216 is provided on only one side of the current collector 212, it should be understood that a layer of active material similar or identical to that shown as active material 216 may be provided or coated on both sides of the current collector 212.

According to an exemplary embodiment, the active material 216 consists of Silver Vanadium oxide (SVO) and carbon monofluoride ($CF_x$). In example embodiments, the active material 216 will be comprised of a plurality of sheets of active material, as described below with reference to FIG. 3 and FIG. 4. According to exemplary embodiments, the active material may be provided as one or more additional materials. For example, the positive electrode may comprise lithium cobalt oxide ($LiCoO_2$) and/or one or more of Ni—Mn—Co— oxide and/or Ni—Co—Al oxide.

A binder material may also be utilized in conjunction with the layer of active material 216 to bond or hold the various electrode components together. For example, according to an exemplary embodiment, the layer of coating material may include a conductive additive such as carbon black and a binder such as poly (tetrafluoro ethylene) (PTFE), polyvinylidine fluoride (PVDF) or an elastomeric polymer.

The negative electrode 220 includes a current collector 222 that is made of a conductive material such as a metal. According to an exemplary embodiment, the current collector 222 is titanium and/or copper. While the positive current collector 212 and/or the negative current collector 222 has been illustrated and described as being a thin foil material, the positive and/or the negative current collector may have any of a variety of other configurations according to various exemplary embodiments. For example, the one or both of the positive current collector and the negative current collector may be a grid such as a mesh grid, an expanded metal grid, a photochemically etched grid, a metallized polymer film, or the like.

The negative current collector 222 has an active material 224 provided thereon. While FIG. 2 shows that the active material 224 is provided on only one side of the current collector 222, it should be understood that a layer of active material similar or identical to that shown may be provided or coated on both sides of the current collector 222. The active material 224 can include lithium metal. If other materials besides lithium are used for active material 224, then the active material 224 can include layers similar to those described above with respect to active material 226.

One step in battery manufacturing involves electrolyte filling which is carried out by infiltrating the separator 250 pores with liquid electrolyte. However, recently there has been an increased interest in all-solid-state batteries that use little or no liquid electrolyte. Electrodes and batteries in accordance with various embodiments, therefore, provide electrodes that incorporate solid-state electrolytes and other low conductivity electrolytes. Among other benefits, solid-state electrolytes are provided within the electrodes themselves in a process that controls the amount of solid-state electrolyte that is used. To achieve the high energy density values comparable to those possible with liquid electrolyte batteries, electrodes are provided with high volume fractions of electrode active material (for example, $CF_x$ and SVO). However, when used with solid-state electrolytes or other electrolytes of lower conductivity than the state of the art, high conductivity electrolytes, high power performance of such electrodes suffers due to the low penetration of the reaction front in the electrode, thus achieving a net lower energy density.

Electrodes, and methods for providing methods in accordance with various embodiments provide a graded composition electrode (for example, an cathode, although embodiments may be used as well for anodes) with varying levels (e.g., a gradient) of electrolyte and active material through the thickness of the electrode. While example embodiments may typically be used to provide cathodes (e.g., positive electrodes) in various batteries, example embodiments can also be used in the fabrication of anodes (e.g., negative electrodes).

Porous cathodes in use today are typically made by bonding an electrode active material (hereinafter referred to merely as "active material" when appropriate) and an electrical conductivity-imparting agent and other ingredients to a collector made of, for example, aluminum or copper through a binder. The bonding of an electrode material to the collector is conducted by a procedure wherein the active material and other ingredients are mixed with a solution or dispersion of a binder in a liquid medium to prepare a slurry composition. The collector is coated with the slurry composition, and the liquid is removed by, for example, drying, to form a mixed material layer comprising the active material on the collector. The porosity of the electrode dictates the amount of liquid electrolyte that can get infiltrated into the battery through the electrode pores.

Embodiments provide a polymer electrolyte (which can include solid polymer electrolytes or gel polymer electrolytes) or soft solid electrolyte, mixed into an electrode mixture prior to fabrication of the final form of the electrode. Embodiments therefore allow for control of the volume fraction of the solid-state electrolyte electrode by changing the amount of electrolyte that is mixed into the electrode prior to the final fabrication, rather than relying on time-consuming and difficult to manage infilling of liquid electrolytes later on in the manufacturing process. Final forms of the electrodes can be achieved using sheets of the cathode mixes which can be created through a calendering process, which can be laminated to a grid current collector or potentially to other electrode sheets.

Some embodiments are applied only to hybrid, positive electrodes (e.g., cathodes comprised of carbon monofluoride and/or silver vanadium oxide, for example) that are used for a primary battery using a lithium metal anode. To allow penetration of the reaction front into the depths of a thick electrode during high current drain events, a gradient is provided by placing a first electrode sheet that is rich (or about 75-80% percent by weight) in active materials such as $CF_x$ and SVO inside a composite cathode comprised of active materials, conductive carbon, binder, and solid-state electrolyte. The first electrode sheet may therefore include a lower (20-25% by weight) in solid-state electrolyte close the current collector 222. Successive electrode sheets are laminated to the first electrode sheet, each having lower and lower percentages of active material and higher percentages of solid-state electrolytes, as will be described in more detail below with respect to FIG. 3 and FIG. 4.

There may be additional benefits to the electrode from a mechanical standpoint realized during expansion of the electrode when using a gradient composition electrode. Optimization of electrolyte and active material gradient across the electrode thickness may be performed to simultaneously optimize for electrical and mechanical performance.

Figure 3:
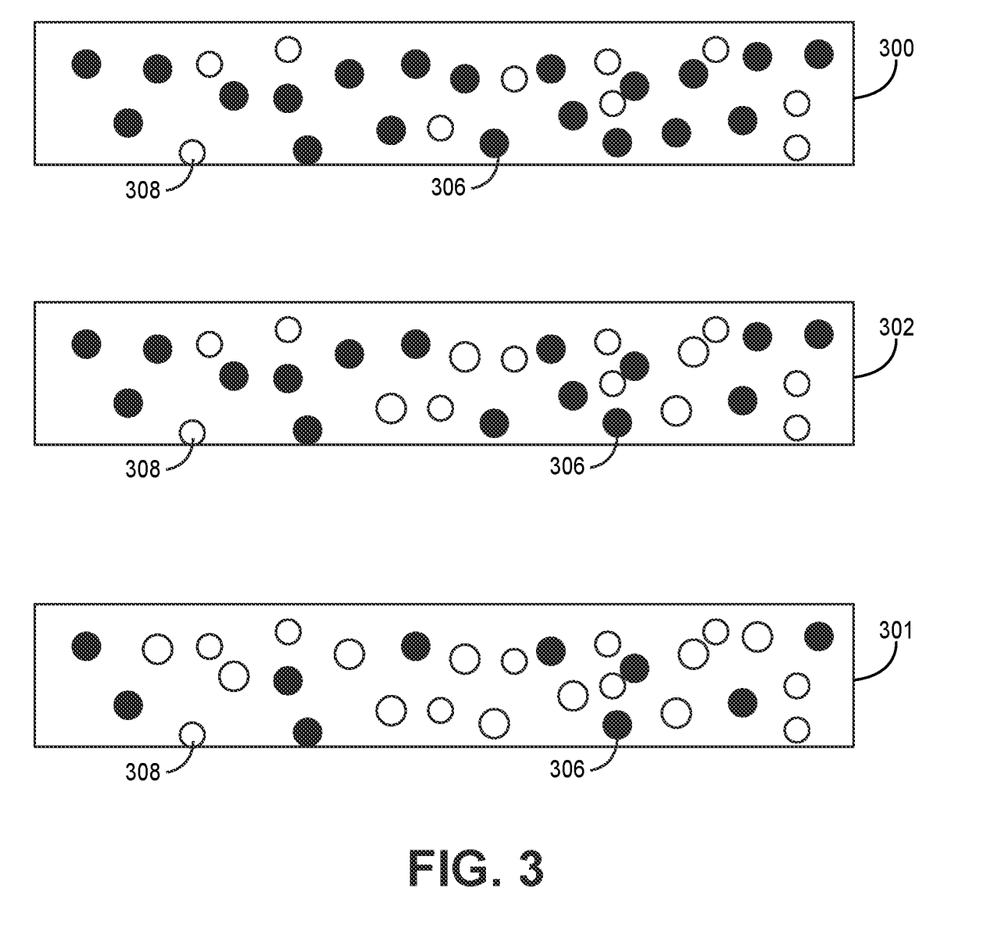
FIG. 3 shows electrode sheets having varying percentages of a solid-state electrolyte in accordance with embodiments described herein.

FIG. 3 shows electrode sheets 300, 302 and 301 having varying percentages of a solid-state electrolyte in accordance with embodiments described herein. A first electrode sheet 300 can be comprised of a mixture of electrolyte 306 and active material 308. Active material can include, for example, CFx, SVO, $MnO_2$, Sulfur, $FeF_3$, $CuF_2$, $BiF_3$, etc. The first electrode sheet 300 can comprise a first percentage of electrolyte 306 35% (wt.) or 31-58 vol. %] and a first percentage of active material 308 (for example, 58%-63% (wt.); 27-56 vol. %). A second electrode sheet 302 can also be comprised of a mixture of electrolyte 306 and active material 308. The second electrode sheet 302 can comprise a second, lower percentage of electrolyte 306 (for example, 27.5% (wt.); 24-51% vol.) and a second, higher percentage of active material 308 (for example, 64%-70% (wt.) or 33-62 vol. %, relative to the first electrode sheet 300. A third electrode sheet 301 can also be comprised of a mixture of electrolyte 306 and active material 308. The third electrode sheet 301 can comprise a third, lower percentage of electrolyte 306 (for example, 20% (wt.) or 18-41 vol. %) and a third, higher percentage of active material 308 (for example, 71%-78% (wt.) or 41-69 vol. %), relative to the either of the first or second electrode sheet 300. While three electrode sheets 300, 302 and 301 are shown, it will be appreciated that any number of electrode sheets can be used. Some example solid-state electrolyte materials can include sulfide compounds (e.g. Argyrodite, LGPS, LPS, etc.), garnet structure oxides (e.g. LLZO with various dopants), sodium super ionic conductor (NASICON)-type phosphate glass ceramics (LAGP), oxynitrides (e.g. lithium phosphorus oxynitride or LIPON), polymers (PEO), borohydrides such as LiBH4 or similar complex borohydrides, anti-perovskite electrolytes such as Li3OCl or similar electrolytes.

Figure 4:
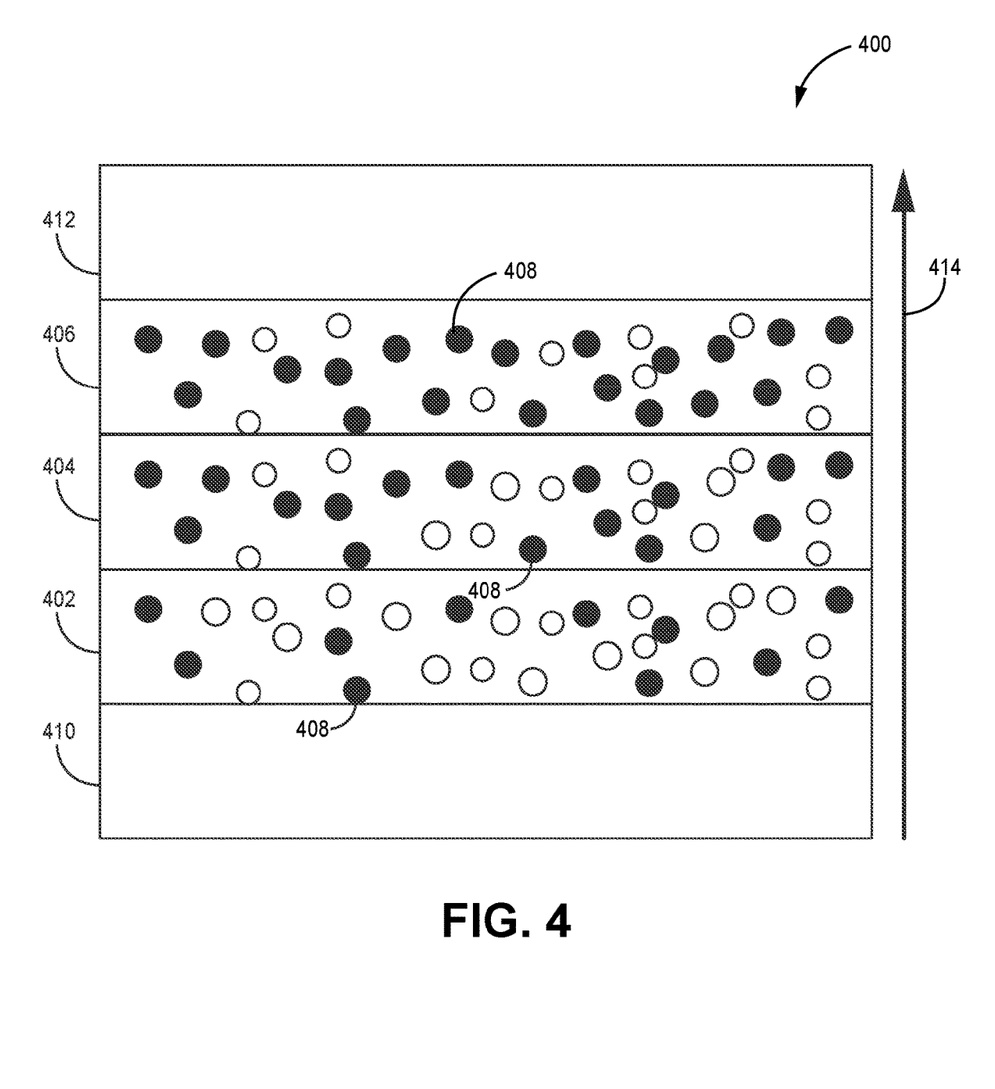
FIG. 4 shows an electrode having a gradient of percentages of a solid-state electrolyte in accordance with embodiments described herein.

FIG. 4 shows an electrode 400 having a gradient of percentages of a solid-state electrolyte in accordance with embodiments described herein. The electrode 400 includes a plurality of sheets 402, 404, 406 of electrode mixture. The plurality of sheets including a first (e.g., top) sheet 406 comprised of a first electrode mixture including a first percentage of a solid-state electrolyte 408, and a second (e.g., bottom) sheet 402 comprised of a second electrode mixture including a second percentage of the solid-state electrolyte 408. In embodiments, the second percentage of solid-state electrolyte 408 (e.g., the percentage of solid-state electrolyte 408 on the second sheet 402) is lower than the first percentage of the solid-state electrolyte 408 (e.g., the percentage of the solid-state electrolyte 408 on the first sheet 406). The electrode 400 also includes a current collector 410 having the plurality of sheets 402, 404, 406 laminated sequentially thereon. The plurality of sheets 402, 404, 406 of the electrode are also laminated together such that the second sheet 402 is closer to the current collector than is the first sheet 406, and such that the first sheet 406 is closer to the separator 412 than is the second sheet 402. Each of the sheets 402, 404 and 406 also includes different percentages of active material 416 and binder material 418.

A third sheet 404 is illustrated as having a percentage of solid-state electrolyte 408 between that of the first sheet 406 and the second sheet 402. While three sheets 402, 404, 406 are shown, it will be appreciated that any number of sheets can be provided, with any desired percentage of solid-state electrolyte 408. Methods and electrodes according to embodiments, therefor, provide a gradient 414 of varying solid-state electrolyte 408 percentages, such that the solid-state electrolyte 408 percentages can be increased with increasing sheet distance from the collector 410.

This gradient allows penetration of the reaction front into the depths of a thick electrode 400 during high current drain events. Rate capability of the battery would also normally be reduced by replacement of the liquid electrolyte with solid-state electrolyte, but the presence of the gradient overcomes this effect so that rate capability is the same or even improved relative to liquid electrolyte batteries due to increased surface area and lower resistance of an electrode fabricated in accordance with embodiments. Such a gradient 414 is difficult to achieve with conventional porous electrodes, as pores would become compressed as lamination of electrode sheets occurs. Methods and electrodes according to embodiments allow for avoidance of such compression, and direct control of the gradient 414, through pre-mixing of solid-state electrolytes into the sheets 402, 404, and 406.

Figure 5:
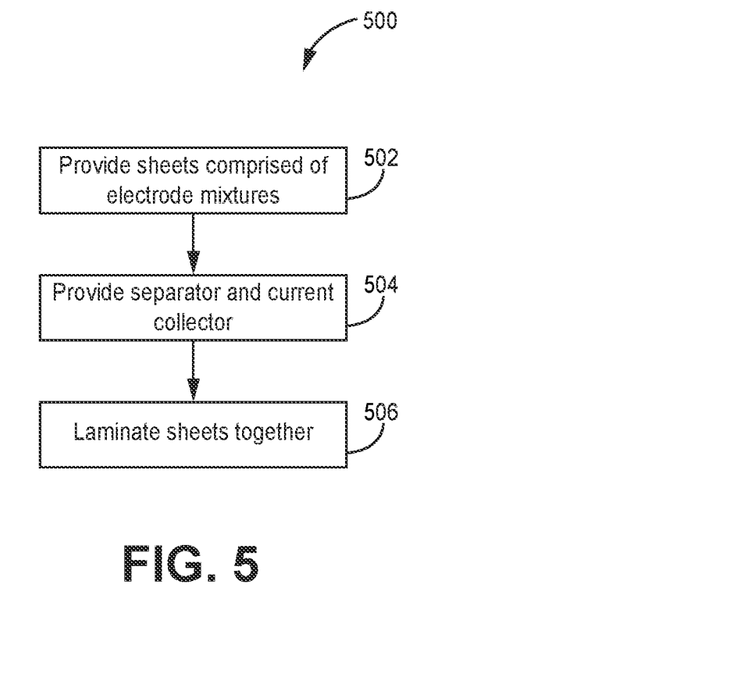
FIG. 5 illustrates a method of fabricating an electrode in accordance with embodiments described herein.

FIG. 5 illustrates a method 500 of fabricating an electrode in accordance with embodiments described herein. Reference is made to structures described with respect to FIG. 4. Method 500 can begin with operation 502 with providing a plurality of electrode mixtures comprised of varying percentages of a solid-state electrolyte 408, an active material 416, a conductive material, and a binder material 418. The solid-state electrolyte 408 can include any of the solid-state electrolyte materials described earlier herein, for example, polymer electrolyte (both gel or solid polymer), or soft solid-state electrolytes.

Method 500 can continue with operation 504 with sequentially applying a plurality of sheets 402, 404, 406 to a current collector 410. A sheet of the plurality of sheets will be comprised of an electrode mixture of the plurality of electrode mixtures created in operation 504. Once the sheets are applied, the sheets will form a gradient from a lowest percentage of solid-state electrolyte 408 at a sheet 402 closest to the current collector 410 to a highest percentage of solid-state electrolyte 408 at a sheet 406 furthest from the current collector 410. Method 500 can continue with operation 506 with calendering the applied sheets.

All scientific and technical terms used herein have meanings commonly used in the art unless otherwise specified. The definitions provided herein are to facilitate understanding of certain terms used frequently herein and are not meant to limit the scope of the present disclosure.

As used herein, singular forms "a," "an" and "the" include plural references unless the context clearly dictates otherwise. As used in this specification and the appended claims, the term "or" is generally employed in its sense including "and/or" unless the content clearly dictates otherwise. The term "and/or" means one or all of the listed elements or a combination of any two or more of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the inventive technology.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

It will be apparent to those skilled in the art that various modifications and variations can be made to the present inventive technology without departing from the spirit and scope of the disclosure. Since modifications, combinations, sub-combinations and variations of the disclosed embodiments incorporating the spirit and substance of the inventive technology may occur to persons skilled in the art, the inventive technology should be construed to include everything within the scope of the appended claims and their equivalents.

What is claimed is:

1. A lithium-ion battery comprising:
   a negative electrode;
   a positive electrode; and
   a polymeric separator between the negative electrode and the positive electrode,
   wherein the positive electrode comprises:
   a plurality of sheets of electrode mixture, the plurality of sheets including a first sheet comprised of a first electrode mixture including a first percentage of a solid-state electrolyte, wherein the first electrode mixture includes about 31-58 percent by volume of the solid-state electrolyte, and a second sheet comprised of a second electrode mixture including a second percentage of the solid-state electrolyte, the second percentage of solid-state electrolyte being lower than the first percentage of the solid-state electrolyte, and
   a current collector having the plurality of sheets laminated thereon, the plurality of sheets of the positive electrode being laminated together such that the second sheet is closer to the current collector than is the first sheet, and such that the first sheet is closer to the separator than is the second sheet.

2. The lithium-ion battery of claim 1, wherein the solid-state electrolyte comprises a polymer electrolyte.

3. The lithium-ion battery of claim 2, wherein the polymer electrolyte comprises a gel polymer electrolyte.

4. The lithium-ion battery of claim 1, wherein the plurality of sheets are laminated such that a sheet closer to the current collector include a lower volume percentage of solid-state electrolyte than any sheet that is further from the current collector.

5. The lithium-ion battery of claim 1, wherein the positive electrode is a cathode.

6. The lithium-ion battery of claim 5, wherein the positive electrode is a hybrid cathode and the battery is a primary battery.

7. The lithium-ion battery of claim 1, wherein the first electrode mixture further comprises a carbon conductive agent and a binder.

8. The lithium-ion battery of claim 1, wherein each of the plurality of sheets further comprises an active material.

9. The lithium-ion battery of claim 8, wherein the active material comprises carbon monofluoride, silver vanadium oxide, or carbon monofluoride and silver vanadium oxide.

10. The lithium-ion battery of claim 1, wherein the first sheet comprises about 35% by weight of the solid-state electrolyte.

11. The lithium-ion battery of claim 1, wherein the second sheet comprises about 20% by weight of the solid-state electrolyte.

12. The lithium-ion battery of claim 1, wherein the positive electrode further comprises a third sheet,
   wherein the third sheet is closer to the separator than the second sheet,
   wherein the third sheet comprises an electrode mixture comprised of 18-41 percent by volume of the solid state electrolyte, and
   wherein the second sheet comprises an electrode mixture of 24-51 percent by volume of the solid-state electrolyte.

13. An electrode comprising:
   at least three sheets of electrode mixtures, the electrode mixtures comprised of varying percentages of a solid-state electrolyte and an active material, the at least three sheets laminated together such that a top sheet comprises a highest percentage of the solid-state electrolyte, and such that a gradient of percentages of the solid-state electrolyte is formed from the top sheet to a bottom-most sheet comprised of a lowest percentage of the solid-state electrolyte, wherein at least one of the at least three sheets includes an electrode mixture of about 31-58 percent by volume of the solid-state electrolyte, wherein at least one of the at least three sheets comprises an electrode mixture of 24-51 percent by volume of the solid-state electrolyte, and wherein at least one of the at least three sheets comprises an electrode mixture of 18-41 percent by volume of the solid-state electrolyte.

14. The electrode of claim 13, wherein the solid-state electrolyte comprises a polymer electrolyte.

15. The electrode of claim 13, wherein the bottom-most sheet is closer to a current collector relative to the top sheet.

16. The electrode of claim 13, wherein the active material comprises carbon monofluoride, silver vanadium oxide, or carbon monofluoride and silver vanadium oxide.

* * * * *